Patented Mar. 18, 1952

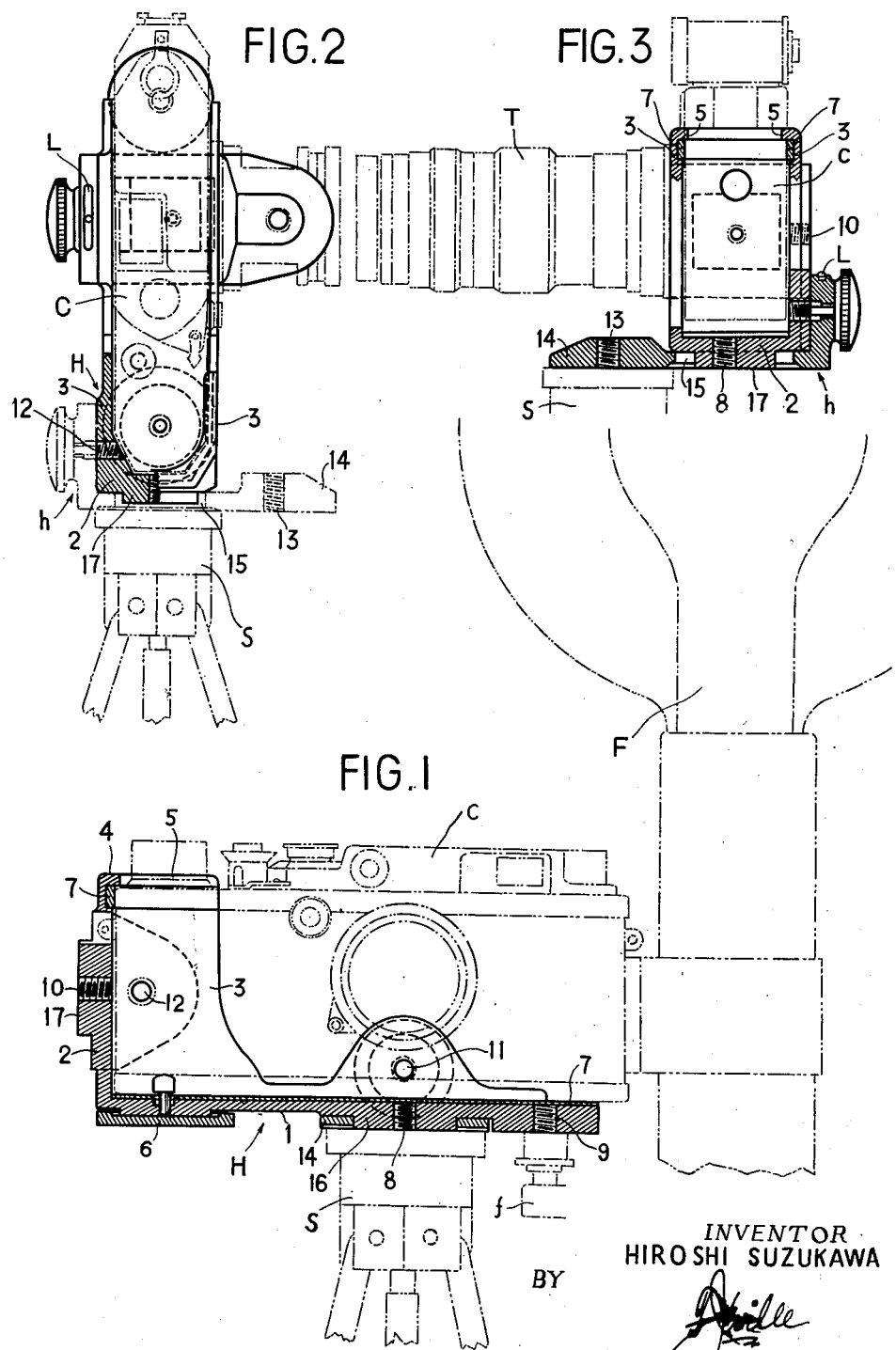

2,589,892

UNITED STATES PATENT OFFICE 2,589,892

CAMERA HOLDER

Hiroshi Suzukawa, Suginami-ku, Tokyo, Japan, assignor to Canon Camera Company, Ltd., Chuouku, Tokyo, Japan, a corporation of Japan Application September 5, 1950, Serial No. 183,195
In Japan August 30, 1949

5 Claims. (Cl. 95—86)

This invention relates to holders for stably supporting a camera, particularly one provided with an attached flash exposure equipment, even when employing a telephoto lens.

The object of the present invention is to make provision that the supporting vertical line of a tripod will pass through the consolidated center of gravity, or a point adjacent thereto, of a camera having attached thereto a telephoto-lens and a flashing equipment in order to support the assembly in an exceedingly stable state.

The feature of this invention is in the high degree of compactness and solidness of the device and in that the device shows the excellent effects for the many modes of supporting, and furthermore in that the camera surface may not be injured by the holder.

The camera holder according to the present invention comprises a main holder and an auxiliary holder both of metal. The former firmly holds the camera so as not to interfere with the operations required for any type of photography and not to injure the camera surface, and has several screw holes for connecting the tripod, etc., while the latter may be attached to the former and has a forwardly projecting portion to which the tripod is connectible.

To attain a firm connection of the main holder with the camera, the main holder is made in a solid semi-box form comprising a main plate part of L-shape in its longitudinal section to cover the whole bottom surface and one end surface of a camera, additional members vertically connected with the edges of the main part to hold portions of each of the front and rear surfaces of the camera, and flange formed portions projecting horizontally from the upper edge of the end portion of the main part and from the upper edges of both of said additional members to engage a portion of the upper surface of camera. According to the above structure, the main holder can be easily attached to the camera merely by inserting the camera into it from one end and may be firmly connected with the camera by means of only one set screw.

The auxiliary holder is made of an L-shaped plate having a screwed hole to fit a projection formed on the bottom and end surfaces of the main holder for maintaining its certain position, and a leg projecting forwardly from the bottom or end of the camera upon attaching it to the rear portion of the main holder by the aid of a cramp screw to which projecting portion the tripod may be fitted.

The constructions, functions and features of the camera holder according to this invention may be fully understood by reference to the accompanying drawings in which:

Fig. 1 is a vertical sectional view along the central longitudinal line of the camera holder embodying the present invention;

Fig. 2 is a horizontal sectional view along the longitudinal line;

Fig. 3 is a vertical sectional view along the transverse line.

The camera, the lens and the flashing equipment etc. being shown in all the figures by fine chain lines to impart a clear understanding of the use and operation of the camera holder of the present invention.

The main holder H is essentially a rigid body of semi-box shape having a vertical longitudinal section which is roughly L-shaped, and comprises a bottom 1, substantially coextensive with the bottom of the camera C for which it is adapted, a vertical end wall 2 integral with the bottom, and the partial front and rear walls 3 also integral with the bottom. Walls 2 and 3 are of such height that the horizontal flanges 4 and 5, respectively integral therewith, will rest against the upper face of the camera, upon sliding the camera against the end wall 2 on the bottom 1, the flanges being so shaped and of such size as to clear all projections, such as the winding knob and scale, on the upper camera face. Longitudinally the camera, the partial front and rear walls 3 extend but a small distance at camera receiving height and then drop away to such height as merely to provide a guide of minimum height for the bottom of the camera except at the region in both walls corresponding to the lens opening in the front camera wall where they rise to such vertical height that the threaded bore 11 may be accommodated in the rear one of walls 3 for the auxiliary holders, which longitudinal shape is best shown in Figure 1. With the camera abutting the end wall 2, a tripod screw hole normally in the bottom of the camera will register with a bore provided in bottom 1, through which the camera is locked into position in the holder by the screw 6. To minimize surface injury to the camera and its casing, a thin woolen cloth or similar material 7 may preferably line the interior of the holder. A threaded bore 8 is provided in the holder bottom in substantial alignment with the camera lens axis, and a similar threaded bore 10 in the end wall 2, for the tripod, while a further threaded hole 9 in the bottom is positioned near the end remote from the end wall 2 for attaching a flash-light accessory f. The full camera height portion of the rear wall 3 is provided with a threaded bore 12 for selectively attaching the auxiliary holder as below described.

The auxiliary holder $h$ is L-shaped in its longitudinal section and the portion 14 thereof protruding forwardly beyond the main holder, either when the auxiliary holder is mounted on the bottom 1 and the rear wall 3, or on the end wall 2 and the rear wall 3, has a threaded bore 13 for the tripod. The portion of the auxiliary holder registering with the main holder has a central opening 15 into which the projection 16 on the lower surface of bottom 1, respectively the projection 17 on the outer surface of the end wall 2, fits. The auxiliary holder is clamped in either position, that is about the projections 16 and 17, by means of a knurled screw in the arm of the auxiliary holder adapted to engage the rear wall 3, which screw is tightened in the threaded bore 11 and the threaded bore 12, respectively. A level L may be built into the auxiliary holder if necessary.

Thus with the holder of the instant invention, the consolidated center of gravity of the camera, the holder, and the flashing equipment F attached to the camera, and even including the auxiliary flashing equipment $f$, will be approximately aligned with the threaded bore 8, and the assembly will thus be stably supported when a tripod S is threaded into the bore 8. When the standard lens of the camera is replaced by a telephoto lens T, as in Figure 3, even with the flashing equipment F still attached to the camera, the auxiliary holder $h$ is attached to the main holder by the use of threaded bore 11, and the tripod S is now connected to the threaded bore 13 with the result that the assembly is again stably supported. If now it be desired to take a picture with the camera held endwise and using the standard lens, the auxiliary holder is attached to the threaded bore 12 with the opening 15 fitted over the end wall projection 17, and stability of the assembly is again obtained by threading the tripod S through the central opening into the bore 10. If in such position the telephoto lens is used, the auxiliary holder remaining as just described, the tripod is removed and screwed into threaded bore 13 to reestablish stability.

In order that the camera can be used on a table without the tripod, the holder is so constructed that both the bottom surfaces of the screw 6 for fixing the main holder to the camera and of the auxiliary holder $h$ may be in a plane parallel to the bottom surface of camera and the auxiliary holder may act as the supporter. The device of this invention, accordingly, may be called a universal camera holder.

I claim:

1. A camera holder comprising a bottom having a surface area coextensive with the bottom of a camera, an end wall integral with the bottom, a front and rear wall integral with the bottom, the end wall being of camera height and the front and rear walls being of camera height at the region thereof adjacent the end wall and of lesser height at the other regions, flanges on the end wall and the adjacent regions of the front and rear walls extending inwardly, the end wall, the adjacent regions of the front and rear walls, the bottom and the flanges forming a pocket snugly to receive one end of the camera, means extending through the bottom and into the bottom of the camera locking the camera into the pocket and to the holder, an L-shaped member adapted selectively to be attached to the rear wall in the vertical and the horizontal position, a projection integral with the L-shaped member extending forwardly of the camera selectively from the bottom and the end wall, and means in each the end wall, the bottom and the projection for attaching a tripod.

2. A camera holder according to claim 1 in which the means for locking the camera in the pocket comprises a threaded bore in the camera bottom, a corresponding threaded bore in the holder, and a single set screw threaded into the said bores.

3. A camera holder according to claim 1 in which the lower surface of the bottom is recessed about each the means for locking the camera to the holder and the means for attaching the tripod thereto, the means for locking the camera including a set screw having a flat surfaced head which when in the locking position is coplanar with the unrecessed regions of the lower surface of the bottom, and the L-shaped member has a leg portion of such height that when the L-shaped member is attached to the rear wall with its projection extending forwardly of the bottom, the lower surface of the leg portion is also coplanar with the unrecessed regions of the lower surface of the bottom.

4. A camera holder according to claim 1 in which a projection is provided about the means for attaching the tripod, and the leg portion of the L-shaped member from which the forwardly extending projection thereof extends is adapted to fit about the end wall when the L-shaped member is attached to the rear wall with its projection extending forwardly the end wall, the end wall projection being of such height that its outer surface and the outer surface of the leg portion are coplanar.

5. A camera holder having a pocket adapted snugly to receive one end of a camera, the pocket having a bottom extending beyond the pocket the full camera length, means for locking the camera in the pocket, an L-shaped member adapted selectively to be attached to the holder transversely the camera and having a projection extending forwardly of the camera in the pocket, a plurality of tripod attaching means in the holder, and a tripod attaching means in the projection of the L-shaped member, whereby the tripod may selectively be attached to the holder containing the camera in the pocket and the attached L-shaped member stably to support the camera, holder and L-shaped member in accordance with the type of photography and camera position to be employed.

HIROSHI SUZUKAWA.

REFERENCES CITED

The following references are of record in the file of this patent:

UNITED STATES PATENTS

| Number | Name | Date |
|---|---|---|
| 2,479,716 | Bensen | Aug. 23, 1949 |
| 2,495,265 | Krogman | Jan. 24, 1950 |

FOREIGN PATENTS

| Number | Country | Date |
|---|---|---|
| 618,906 | Great Britain | Mar. 1, 1949 |
| 622,704 | Great Britain | Jan. 24, 1950 |